United States Patent
Popovski

(10) Patent No.: US 11,827,111 B2
(45) Date of Patent: Nov. 28, 2023

(54) HEAT SHRINKABLE AND STRETCHABLE BANDS FOR SEALING TRACTION BATTERY PACK ENCLOSURE ASSEMBLIES

(71) Applicant: FORD GLOBAL TECHNOLOGIES, LLC, Dearborn, MI (US)

(72) Inventor: Mike Popovski, Warren, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 139 days.

(21) Appl. No.: 17/484,239

(22) Filed: Sep. 24, 2021

(65) Prior Publication Data

US 2023/0100026 A1 Mar. 30, 2023

(51) Int. Cl.
*B60L 50/64* (2019.01)

(52) U.S. Cl.
CPC .................................. *B60L 50/64* (2019.02)

(58) Field of Classification Search
CPC .......... B60L 50/64; B60L 50/50; B60K 1/04; B60K 2001/0438; H01M 50/20
See application file for complete search history.

(56) References Cited

U.S. PATENT DOCUMENTS

| | | |
|---|---|---|
| 7,727,667 B2 | 6/2010 | Sakurai |
| 2011/0272895 A1 | 11/2011 | Kritzer et al. |
| 2018/0138559 A1* | 5/2018 | Omura |
| 2022/0093975 A1* | 3/2022 | Hoshina |

FOREIGN PATENT DOCUMENTS

| | | | |
|---|---|---|---|
| CN | 101497305 A | * | 8/2009 |
| DE | 102011111930 A1 | | 2/2013 |
| KR | 20140047306 A | * | 4/2014 |
| WO | WO 2021118028 A1 | * | 6/2021 |

OTHER PUBLICATIONS

Translation of Yoon (KR 20140047306 A) (Year: 2014).*

* cited by examiner

*Primary Examiner* — James A Shriver, II
*Assistant Examiner* — Nicholas R. Kandas
(74) *Attorney, Agent, or Firm* — David B. Kelley; Carlson, Gaskey & Olds, P.C.

(57) ABSTRACT

Electrified vehicles may be powered by traction battery packs. An exemplary traction battery pack may include a heat shrinkable elastic polymer band that may be installed around an external seam of a sealing interface of an enclosure assembly of the traction battery pack. The heat shrinkable elastic polymer band may be heated to shrink the band, thereby forming an adequate seal about the external seam.

20 Claims, 5 Drawing Sheets

HEAT SHRINKABLE AND STRETCHABLE BANDS FOR SEALING TRACTION BATTERY PACK ENCLOSURE ASSEMBLIES

TECHNICAL FIELD

This disclosure relates generally to traction battery packs, and more particularly to heat shrinkable and stretchable bands for sealing traction battery pack enclosure assemblies.

BACKGROUND

Electrified vehicles are selectively driven by battery powered electric machines. Conventional motor vehicles, by contrast, rely exclusively on the internal combustion engine to propel the vehicle.

A high voltage traction battery pack typically powers the electric machines and other electrical loads of electrified vehicles. The traction battery pack includes a plurality of battery cells and various other battery internal components that support electric propulsion of electrified vehicles. The battery cells and other battery internal components are typically housed within an enclosure assembly, and the enclosure assembly is typically sealed using gasket-type seals to prevent moisture from leaking into the interior of the enclosure assembly.

SUMMARY

A traction battery pack according to an exemplary aspect of the present disclosure includes, among other things, a tray, a cover, and a heat shrinkable elastic polymer band disposed at an interface between the tray and the cover. The band is configured for sealing the interface.

In a further non-limiting embodiment of the foregoing traction battery pack, the heat shrinkable elastic polymer band is disposed around an external seam associated with the interface.

In a further non-limiting embodiment of either of the foregoing traction battery packs, the external seam is located between an upper surface of the tray and a peripheral-most surface of the cover.

In a further non-limiting embodiment of any of the foregoing traction battery packs, a first portion of the heat shrinkable elastic polymer band covers a portion of an upper surface of the cover, a second portion of the heat shrinkable elastic polymer band spans across the external seam, and a third portion of the heat shrinkable elastic polymer band covers a portion of a lower surface of a peripheral flange of the tray.

In a further non-limiting embodiment of any of the foregoing traction battery packs, another portion of the heat shrinkable elastic polymer band covers a peripheral-most surface of the cover, and yet another portion of the heat shrinkable elastic polymer band covers a peripheral-most surface of the peripheral flange of the tray.

In a further non-limiting embodiment of any of the foregoing traction battery packs, the peripheral-most surface of the peripheral flange extends outboard of the peripheral-most surface of the cover.

In a further non-limiting embodiment of any of the foregoing traction battery packs, the peripheral-most surface of the cover extends outboard of the peripheral-most surface of the peripheral flange.

In a further non-limiting embodiment of any of the foregoing traction battery packs, a fastener is inserted through the cover and into the tray.

In a further non-limiting embodiment of any of the foregoing traction battery packs, the tray and the cover establish an enclosure assembly, and a battery array is housed inside the enclosure assembly.

In a further non-limiting embodiment of any of the foregoing traction battery packs, the heat shrinkable elastic polymer band is made of a polyolefin.

A method of assembling a traction battery pack according to another exemplary aspect of the present disclosure includes, among other things, securing a cover of an enclosure assembly of the traction battery pack to a tray of the enclosure assembly, installing a heat shrinkable elastic polymer band about an outer perimeter of the enclosure assembly, and heating the heat shrinkable elastic polymer band, thereby sealing an interface between the tray and the cover.

In a further non-limiting embodiment of the foregoing method, installing the heat shrinkable elastic polymer band includes positioning the heat shrinkable elastic polymer band around an external seam associated with the interface.

In a further non-limiting embodiment of either of the foregoing methods, positioning the heat shrinkable elastic polymer band around the external seam includes arranging the heat shrinkable elastic polymer band around a first corner of the enclosure assembly and then stretching the heat shrinkable elastic polymer band around additional corners of the enclosure assembly.

In a further non-limiting embodiment of any of the foregoing methods, the heat shrinkable elastic polymer band envelops the external seam.

In a further non-limiting embodiment of any of the foregoing methods, heating the heat shrinkable elastic polymer band includes applying heat to the heat shrinkable elastic polymer band with a heat source.

In a further non-limiting embodiment of any of the foregoing methods, applying the heat shrinks the heat shrinkable elastic polymer band.

In a further non-limiting embodiment of any of the foregoing methods, the heat shrinkable elastic polymer band is made of a polyolefin.

In a further non-limiting embodiment of any of the foregoing methods, securing the cover to the tray includes inserting a fastener through the cover and then into the tray.

In a further non-limiting embodiment of any of the foregoing methods, the method includes, prior to securing the cover to the tray, positioning a battery array or other battery internal component within the tray.

In a further non-limiting embodiment of any of the foregoing methods, the method includes, prior to installing the heat shrinkable elastic polymer band, applying an adhesive to the heat shrinkable elastic polymer band.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include a heat shrinkable elastic polymer band that may be installed around an external seam of a sealing interface of an enclosure assembly of the traction battery pack. The heat shrinkable elastic polymer band may be heated to shrink the band, thereby forming an adequate seal about the external seam. These and other features are discussed in greater detail in the following paragraphs of this detailed description.

Figure 1:
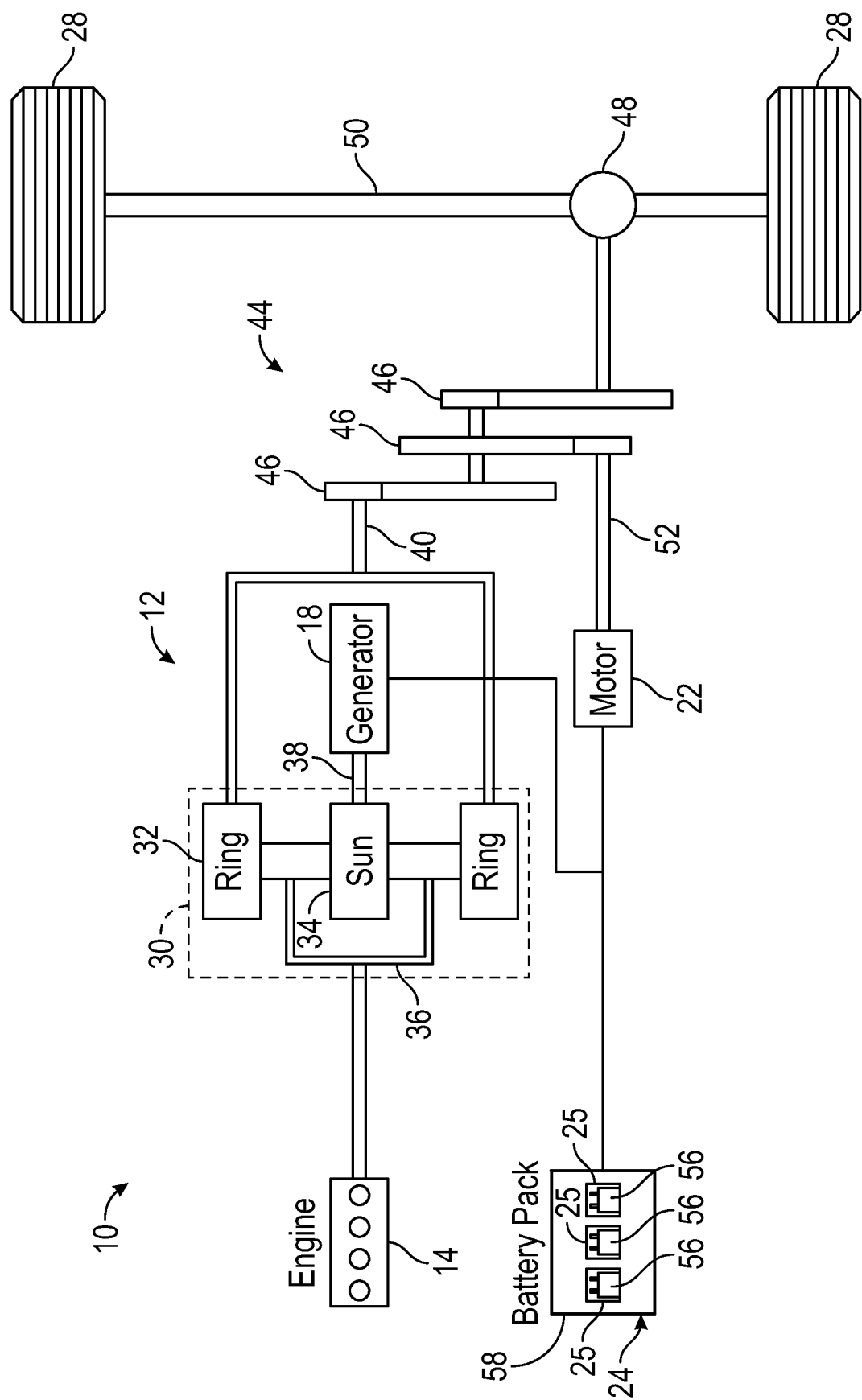
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a traction battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including but not limited to full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In an embodiment, the power transfer unit 30 is a planetary gear set that includes a ring gear 32, a sun gear 34, and a carrier assembly 36.

The generator 18 may be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In an embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the traction battery pack 24.

The traction battery pack 24 is an exemplary electrified vehicle traction battery. The traction battery pack 24 may be a high voltage traction battery pack that includes one or more battery arrays 25 (i.e., battery assemblies or groupings of battery cells 56) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

The total number of battery arrays 25 and battery cells 56 provided within the traction battery pack 24 is not intended to limit this disclosure. In an embodiment, the battery cells 56 of each battery array 25 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery arrays 25 and any other battery internal components (e.g., battery electronics, wiring, connectors, etc.) may be housed within an enclosure assembly 58, which establishes the outermost surfaces of the traction battery pack 24. The enclosure assembly 58 must be sealed in a leak-free manner in order for the traction battery pack 24 to function properly. Achieving a leak free interface can be difficult due to factors such as battery component tolerance stack up and packaging requirements. This disclosure is therefore directed to improved devices and methods for sealing traction battery pack enclosures.

Figure 2:
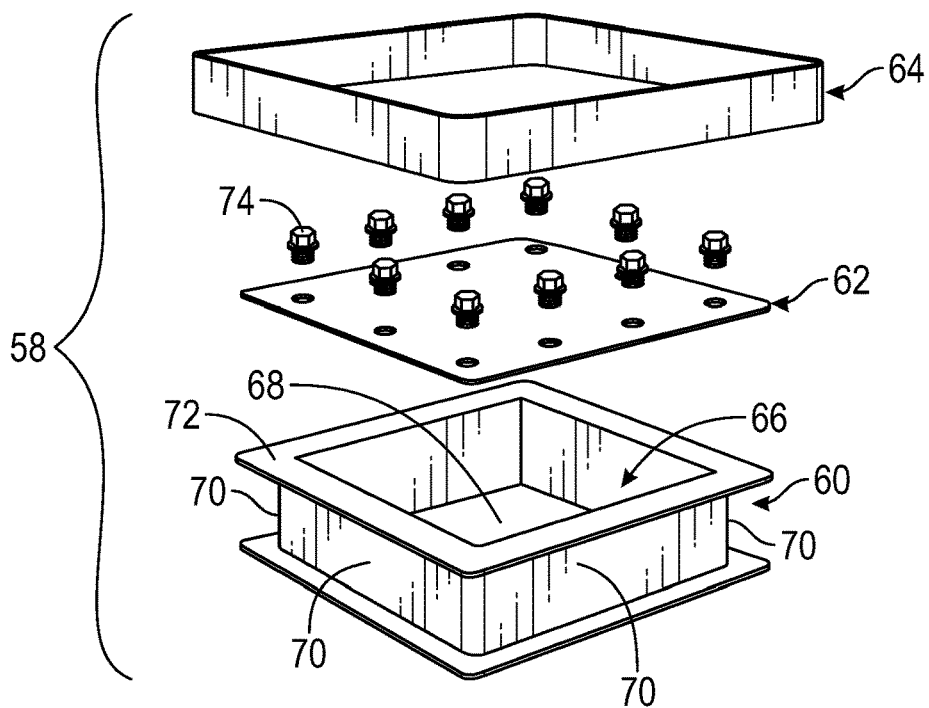
FIG. 2 is an exploded view of an enclosure assembly of a traction battery pack of an electrified vehicle.
Figure 3:
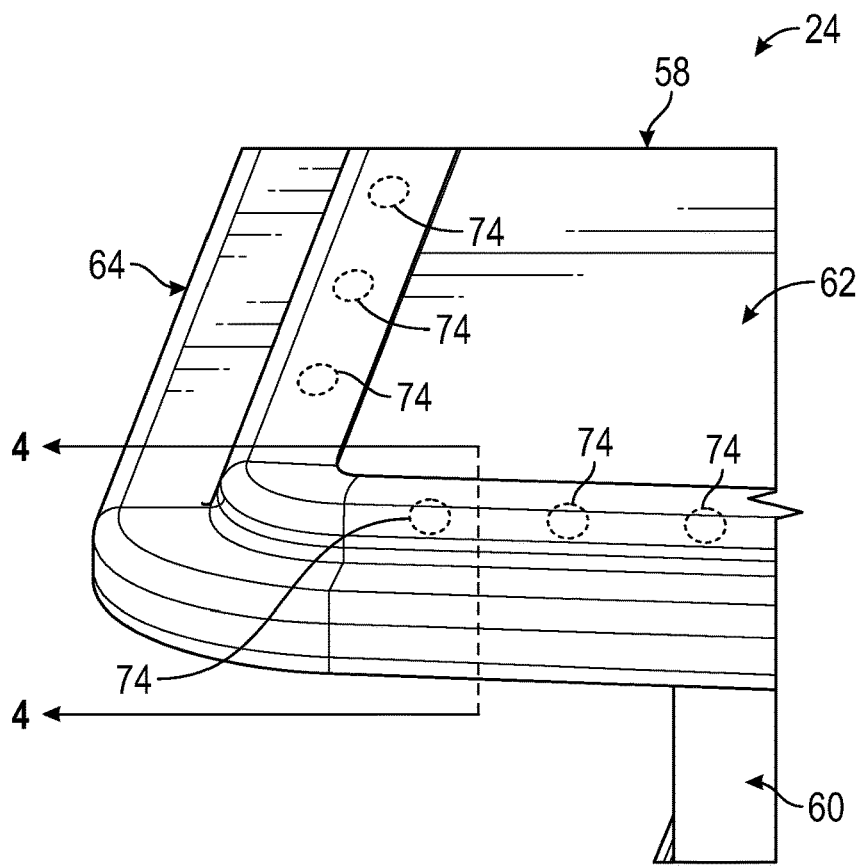
FIG. 3 is a partial view of the enclosure assembly of FIG. 2 when in an assembled state.

FIGS. 2 and 3 illustrate an exemplary enclosure assembly 58 of a traction battery pack, such as the traction battery pack 24 of FIG. 1, for example. FIG. 2 is an exploded view of the enclosure assembly 58, and FIG. 3 is an assembled view of select portions of the enclosure assembly 58.

The enclosure assembly 58 may include a tray 60, a lid or cover 62, and a heat shrinkable elastic polymer band 64. As is further detailed below, the heat shrinkable elastic polymer band 64 may be positioned about portions of the tray 60 and the cover 62 and may then be heated for sealing the enclosure assembly 58 at an interface between the tray 60 and the cover 62.

The tray 60 and the cover 62 of the enclosure assembly 58 may embody any size, shape, and material configuration within the scope of this disclosure. For example, the tray 60 and/or cover 62 could be rectangular, triangular, round, irregular, etc. The tray 60 and the cover 62 may be constructed of metallic materials, polymer-based materials, textile materials, or any combination of these materials. In other embodiments, the tray 60 includes a different shape and material makeup than the cover 62.

The tray 60 may provide an open area 66 for holding battery arrays and other battery internal components (not shown in FIG. 2 for simplicity) of the traction battery pack 24. The open area 66 may be established by a floor 68 and walls 70 that protrude upwardly from the floor 68.

The cover 62 may be fixedly secured to a peripheral flange 72 of the tray 60 via a plurality of fasteners 74, such as screws, bolts, etc. Any amount of the fasteners 74 may be used to secure the cover 62 to the tray 60. In an embodiment, the peripheral flange 72 extends about an entire perimeter of the tray 60 and is located on an opposite end of the walls 70 from the floor 68.

Figure 4:
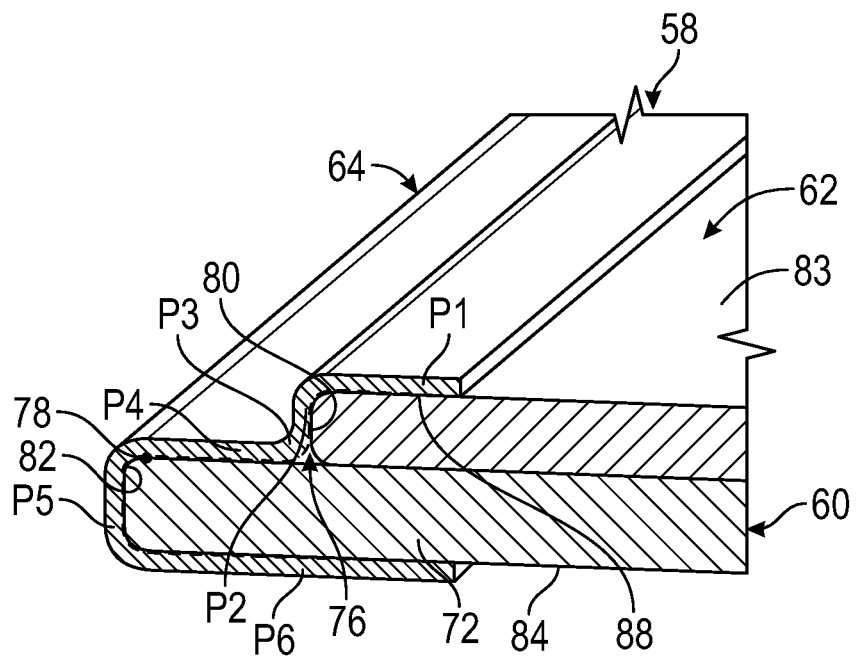
FIG. 4 is a cross-sectional view through section 4-4 of FIG. 3.

Referring now primarily to the cross-sectional view of FIG. 4, an interface between the tray 60 and the cover 62 may establish an external seam 76 at the exterior of the enclosure assembly 58. The external seam 76 may extend between an upper surface 78 of the tray 60 and a peripheral-most surface 80 of the cover 62. It may be desirable to hermetically seal the external seam 76 in order to meet sealing requirements of the traction battery pack 24. The heat shrinkable elastic polymer band 64 may therefore be positioned about the external seam 76 and may then be heated in order to shrink the band, thereby sealing the interface between the cover 62 and the tray 60.

When properly positioned about the enclosure assembly 58 and then shrunk via a heat source, a first portion P1 of the heat shrinkable elastic polymer band 64 may cover portions of an upper surface 83 of the cover 62, a second portion P2 of the band 64 may cover the peripheral-most surface 80 of the cover 62, a third portion P3 of the band 64 may be disposed directly over the external seam 76, a fourth portion P4 of the band 64 may cover portions of the upper surface 78 of the tray 60, a fifth portion P5 of the band 64 may cover the peripheral-most surface 82 of the peripheral flange 72 of the tray 60, and a sixth portion P6 of the band 64 may cover portions of a lower surface 84 of the peripheral flange 72. Therefore, the heat shrinkable elastic polymer band 64 may be extend over perimeter portions of both the cover 62 and the tray 60 to substantially envelop the external seam 76.

Figure 5:
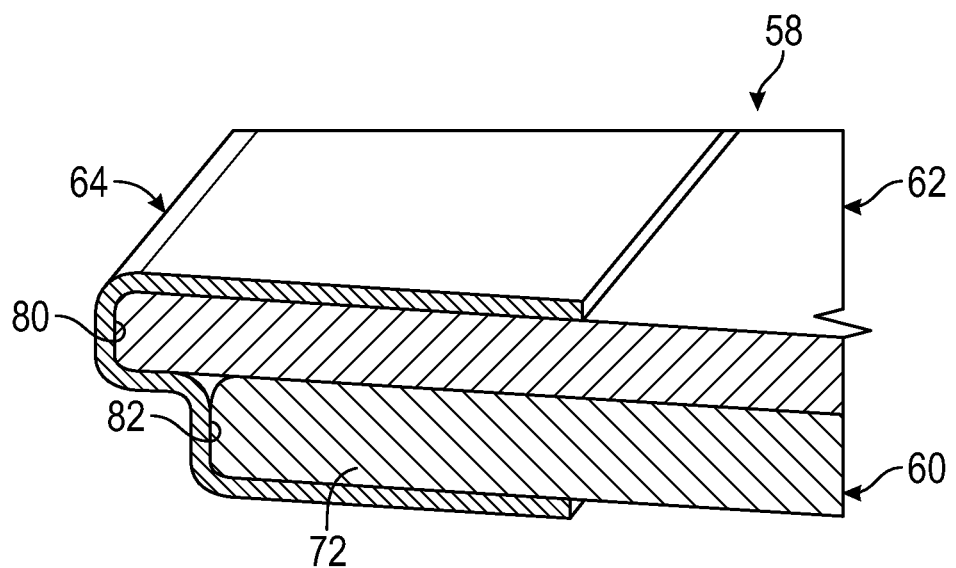
FIG. 5 illustrates select portions of another exemplary enclosure assembly for a traction battery pack.
Figure 6:
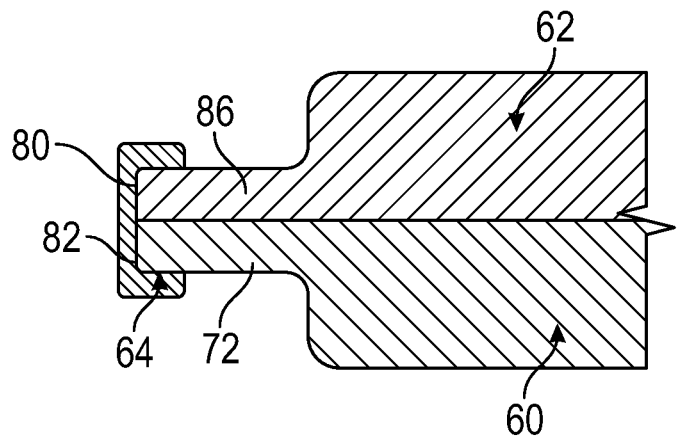
FIG. 6 illustrates select portions of yet another exemplary enclosure assembly for a traction battery pack.

In the illustrated embodiment of FIGS. 2-4, the peripheral-most surface 82 of the peripheral flange 72 of the tray 60 extends laterally outboard of the peripheral-most surface 80 of the cover 62. However, other configurations are also contemplated within the scope of this disclosure. For example, in another embodiment, the peripheral-most surface 80 of the cover 62 may extend laterally outboard of the peripheral-most surface 82 of the peripheral flange 72 of the tray 60 (see, e.g., FIG. 5). In yet another embodiment, the peripheral-most surface 80 of the cover 62 is part of a peripheral flange 86 of the cover 62 and extends to a position that is equidistant with the peripheral-most surface 82 of the peripheral flange 72 of the tray 60 (see, e.g., FIG. 6).

The heat shrinkable elastic polymer band 64 may be made of a material that is both heat shrinkable and has at least some amount of elasticity for stretching the band 64 about the outer perimeter portions of the tray 60 and the cover 62. In an embodiment, the heat shrinkable elastic polymer band 64 is made of a polyolefin. The polyolefin could be a thermoplastic polyolefin or a polyolefin elastomer. However, other materials may also but suitable for constructing the heat shrinkable elastic polymer band 64 within the scope of this disclosure.

In another embodiment, such when stricter sealing requirements so dictate, an adhesive 88 (see FIG. 4) may optionally be used in combination with the heat shrinkable elastic polymer band 64. The adhesive 88 may be applied to an interior surface of the heat shrinkable elastic polymer band 64. The interior surface is the surface located on the side of the heat shrinkable elastic polymer band 64 that faces toward and contacts the enclosure assembly 58. The adhesive 88 may fill in small openings at or near the external seam 76 that could form as a result of defects or odd geometries, for example, thereby augmenting the sealing effect accorded by the band 64. In an embodiment, the adhesive 88 is a heat activated adhesive.

Figure 7:
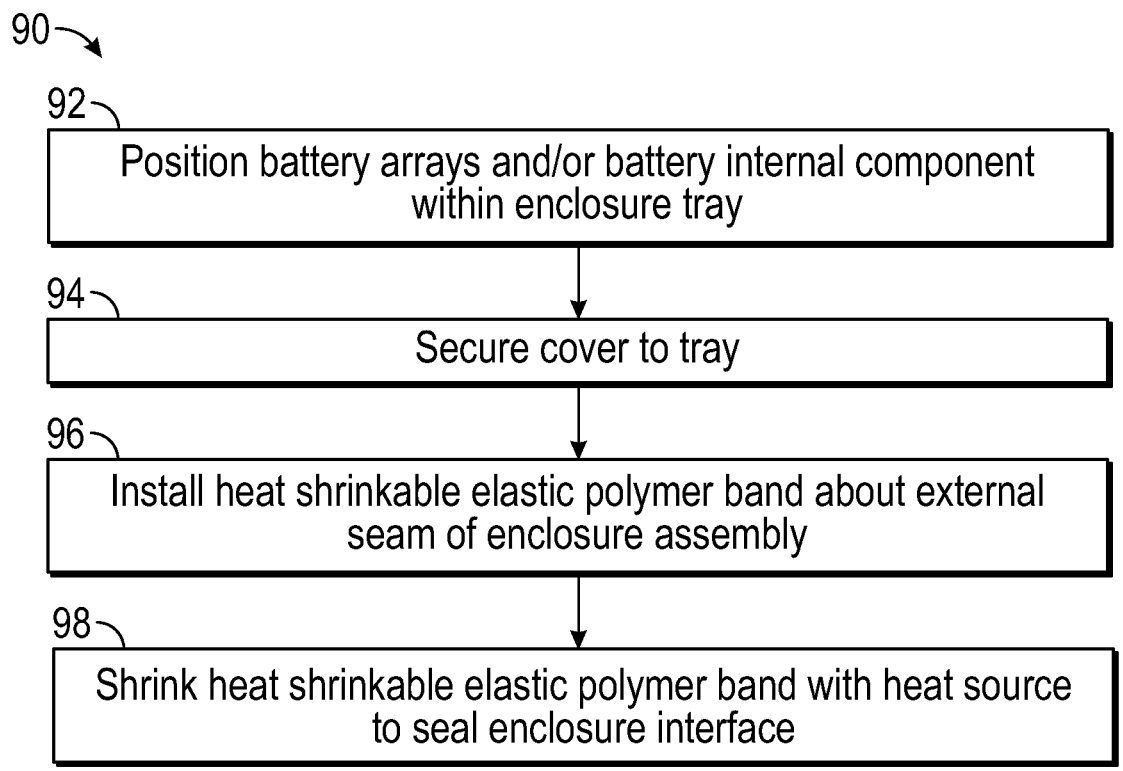
FIG. 7 schematically illustrates a method of assembling a traction battery pack.

FIG. 7, with continued reference to FIGS. 1-6, schematically illustrates, in sequential order, a method 90 for assembling a traction battery pack 24 that includes the enclosure assembly 58 discussed above. It should be understood that fewer or additional steps than are recited below could be performed and that the recited order of steps is not intended to limit this disclosure.

First, one or more battery arrays and/or other battery electronic components may be positioned within the open area 66 of the tray 60 of the enclosure assembly (see block 92). The total number of battery arrays/battery internal components provided within the open area 66 is not intended to limit this disclosure.

Next, the cover 62 of the enclosure assembly 58 may be secured to the tray 60 (see block 94). One or more of the fasteners 74 may be utilized to securely fixate the cover 62 to the tray 60.

Figure 8:
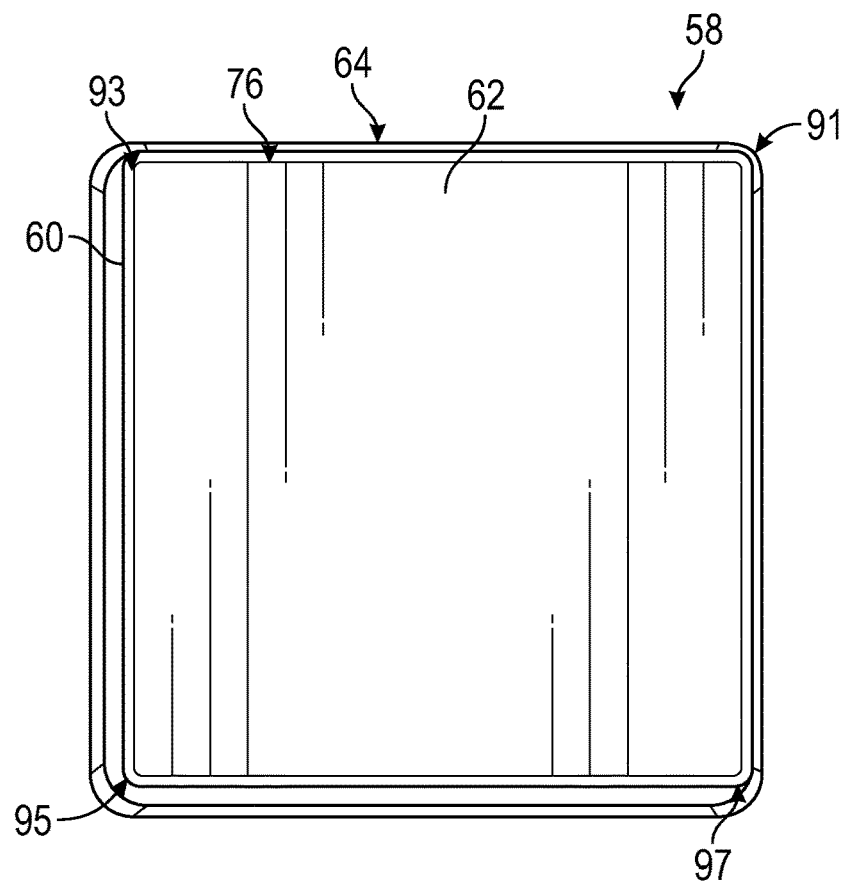
FIG. 8 schematically illustrates an assembly step of the method of FIG. 7 that includes installing a heat shrinkable elastic polymer band about a an enclosure assembly.

The heat shrinkable elastic polymer band 64 may next be installed around the external seam 76 between the cover 62 and the tray 60 (see block 96). In an embodiment, the heat shrinkable elastic polymer band 64 may be positioned about a first corner 91 associated with the external seam 76 and may then be stretched an pulled to position the band about additional corners 93, 95, 97 of the external seam 76 (see, e.g., FIG. 8). The heat shrinkable elastic polymer band 64 may be manipulated around the enclosure assembly 58 in a manner that completely covers the external seam 76.

Next (see block 98), a heat source (e.g., a heat gun, etc.) may be used to shrink the heat shrinkable elastic polymer band 64 around the external seam 76, thereby effectively sealing the interface between the cover 62 and the tray 60. The heat generated by the heat source may cause the band 64 to shrink, or recover in length, for sealing the enclosure interface.

Figure 9:
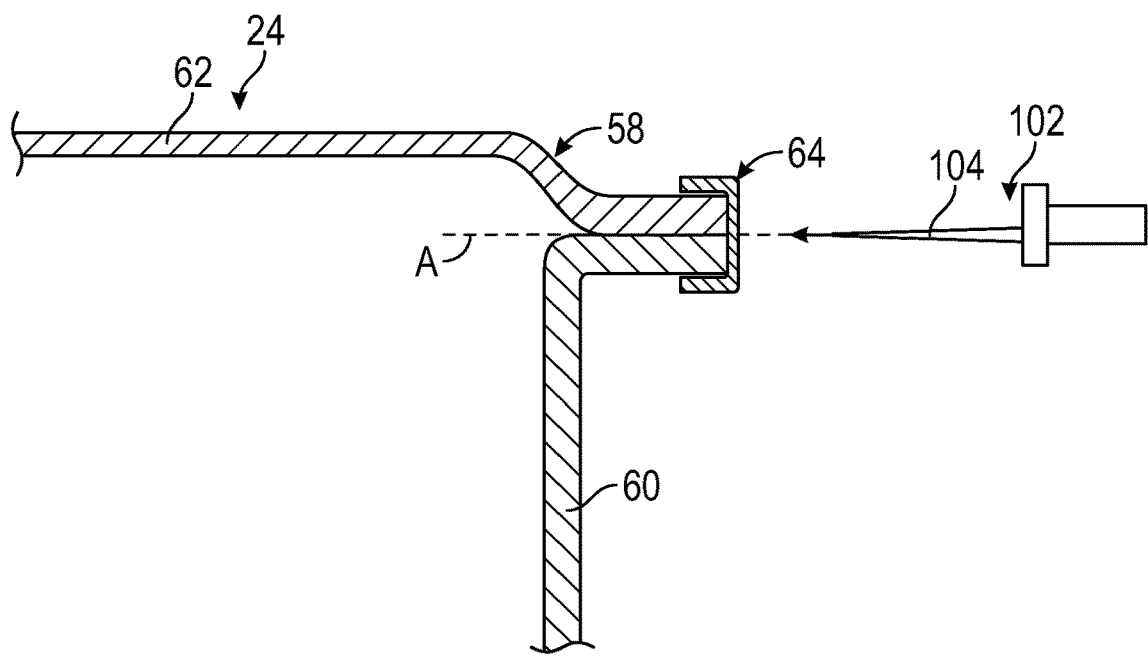
FIG. 9 schematically illustrates a battery pack servicing event.

FIG. 9 illustrates an exemplary servicing event for servicing the traction battery pack 24. In some situations, the heat shrinkable elastic polymer band 64 may need to be removed to gain access to the battery arrays and other battery electronic components that may be housed within the enclosure assembly 58 of the traction battery pack 24 in order to service these components. As illustrated, a cutting tool 102 having a blade 104 may be inserted between the cover 62 and the tray 60 (e.g., along an axis A) to cut the heat shrinkable elastic polymer band 64 and allow the cover 62 to be separated from the tray 60.

The exemplary traction battery packs of this disclosure incorporate heat shrinkable elastic polymer bands for sealing an external seam between a cover and tray of an outer enclosure assembly of the traction battery pack. The heat shrinkable elastic polymer band occupies only the space required by its thickness, thereby minimizing the overall packaging space required to accommodate the band. The elasticity afforded by the material-makeup of the band advantageously accommodates any varying tolerances of battery pack components during assembly.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
    a tray;
    a cover; and
    a heat shrinkable elastic polymer band disposed at an interface between the tray and the cover and configured for sealing the interface,
    wherein the heat shrinkable elastic polymer band is disposed around an entire perimeter of an external seam associated with the interface.

2. The traction battery pack as recited in claim 1, wherein the external seam is located between an upper surface of the tray and a peripheral-most surface of the cover.

3. The traction battery pack as recited in claim 1, wherein a first portion of the heat shrinkable elastic polymer band covers a portion of an upper surface of the cover, a second portion of the heat shrinkable elastic polymer band spans across the external seam, and a third portion of the heat shrinkable elastic polymer band covers a portion of a lower surface of a peripheral flange of the tray.

4. The traction battery pack as recited in claim 3, wherein another portion of the heat shrinkable elastic polymer band covers a peripheral-most surface of the cover, and yet another portion of the heat shrinkable elastic polymer band covers a peripheral-most surface of the peripheral flange of the tray.

5. The traction battery pack as recited in claim 4, wherein the peripheral-most surface of the peripheral flange extends in an outboard direction past the peripheral-most surface of the cover.

6. The traction battery pack as recited in claim 4, wherein the peripheral-most surface of the cover extends in an outboard direction past the peripheral-most surface of the peripheral flange.

7. The traction battery pack as recited in claim 1, comprising a fastener inserted through the cover and into the tray.

8. The traction battery pack as recited in claim 1, wherein the tray and the cover establish an enclosure assembly, and comprising a battery array housed inside the enclosure assembly.

9. The traction battery pack as recited in claim 1, wherein the heat shrinkable elastic polymer band is comprised of a polyolefin.

10. A method of assembling a traction battery pack, comprising:
    securing a cover of an enclosure assembly of the traction battery pack to a tray of the enclosure assembly;
    installing a heat shrinkable elastic polymer band about an outer perimeter of the enclosure assembly; and
    heating the heat shrinkable elastic polymer band, thereby sealing an interface between the tray and the cover,
    wherein installing the heat shrinkable elastic polymer band includes positioning the heat shrinkable elastic polymer band around an entire perimeter of an external seam associated with the interface.

11. The method as recited in claim 10, wherein positioning the heat shrinkable elastic polymer band around the external seam includes arranging the heat shrinkable elastic polymer band around a first corner of the enclosure assembly and then stretching the heat shrinkable elastic polymer band around each additional corner of the enclosure assembly.

12. The method as recited in claim 11, wherein the heat shrinkable elastic polymer band envelops the external seam.

13. The method as recited in claim 10, wherein heating the heat shrinkable elastic polymer band includes applying heat to the heat shrinkable elastic polymer band with a heat source.

14. The method as recited in claim 13, wherein applying the heat shrinks the heat shrinkable elastic polymer band.

15. The method as recited in claim 10, wherein the heat shrinkable elastic polymer band is comprised of a polyolefin.

16. The method as recited in claim 10, wherein securing the cover to the tray includes inserting a fastener through the cover and then into the tray.

17. The method as recited in claim 10, comprising, prior to securing the cover to the tray, positioning a battery array or other battery internal component within the tray.

18. The method as recited in claim 10, comprising, prior to installing the heat shrinkable elastic polymer band, applying an adhesive to the heat shrinkable elastic polymer band.

19. The method as recited in claim 16, wherein the fastener is concealed beneath a portion of the heat shrinkable elastic polymer band after installing and heating the heat shrinkable elastic polymer band.

20. The traction battery pack as recited in claim 7, wherein the fastener is concealed beneath a portion of the heat shrinkable elastic polymer band.

* * * * *